United States Patent [19]
Hack et al.

[11] Patent Number: 5,204,661
[45] Date of Patent: Apr. 20, 1993

[54] INPUT/OUTPUT PIXEL CIRCUIT AND ARRAY OF SUCH CIRCUITS

[75] Inventors: Michael Hack, Mountain View; Alan G. Lewis, Sunnyvale; Richard H. Bruce, Los Altos, all of Calif.

[73] Assignee: Xerox Corporation, Stamford, Conn.

[21] Appl. No.: 626,795

[22] Filed: Dec. 13, 1990

[51] Int. Cl.$^5$ .............................................. G09G 3/00
[52] U.S. Cl. ..................................... 340/784; 340/707
[58] Field of Search ................... 340/784, 707, 712; 358/213.18, 213.13; 359/72

[56] References Cited

U.S. PATENT DOCUMENTS

| | | | |
|---|---|---|---|
| 4,345,248 | 8/1982 | Togashi et al. | 340/784 |
| 4,395,736 | 7/1983 | Fraleux | 358/213 |
| 4,614,966 | 9/1986 | Yunoki et al. | 358/221 |
| 4,655,552 | 4/1987 | Togashi et al. | 359/60 |
| 4,698,686 | 10/1987 | Endo et al. | 358/213.18 |
| 4,876,585 | 10/1989 | Ozawa | 357/24 |

OTHER PUBLICATIONS

Matsumura et al., *Amorphous-Silicon Image Sensor IC*, IEEE Electron Device Letters, vol. EDL-1, No. 9, Sep., 1980 pp. 182-184.

*Manufacturing Hurdles Challenge Large-LCD Developers*, IEEE Spectrum, Sep. 1989, pp. 36-40.

Primary Examiner—Jeffery A. Brier

[57] ABSTRACT

A light sensing and display driving apparatus is operable independent of polling cycle providing a more accurate sensing of the patterns of illumination incident on an array of such apparatus, with a minimum of required interconnections per pixel. Each address line may simultaneously initialize one row of apparatus while enabling the subsequent row of apparatus. The apparatus is also compatible with elements capable of providing gain in the sensing mode, given that the photosensitive element is separate from the path across which voltage or current is measured. The display driving portion is compatible with standard active-matrix LCDs. The apparatus allows a minimum physical isolation between the sensing and display portions while maintaining sufficient electrical isolation to prevent the deleterious effects resulting from application of a display driving potential to sensing circuitry, and allows employing a timing scheme for both sensing and display driving within a short time period. The apparatus may be fabricated of amorphous silicon. The apparatus includes, inter alia, a conductive element interconnecting input and output terminals, a multiple-state sensing device whose state changes in response to the incidence of electromagnetic or ionizing radiation thereupon, apparatus connected to the conductive element and to the sensing device for modifying the conductance of the conductive element as a function of the state of the sensing device, and a display driving element connected also to the input and output terminals. A filter may be interposed between a light source and the circuit or the array of circuits to provide color or similar source differentiation.

7 Claims, 4 Drawing Sheets

INPUT/OUTPUT PIXEL CIRCUIT AND ARRAY OF SUCH CIRCUITS

CROSS REFERENCE TO RELATED APPLICATIONS

The present application relates to copending application Ser. No. 07/619,360 of Hack et al., filed Nov. 28, 1990, entitled "Timing Independent Pixel-Scale Light Sensing Apparatus" which is incorporated by reference herein, and U.S. Pat. No. 5,083,175 which is also incorporated by reference herein.

BACKGROUND OF THE INVENTION

The present invention relates generally to sensing and display apparatus, and more particularly to an apparatus capable of both sensing (inputting) an input signal and displaying (outputting) pixel data, which is able to indicate the incidence of light occurring at any time during a polling cycle, which uses a minimum number of address and data lines per cell for both the input and output functions, and which is configured to allow the circuit to provide gain.

As background to the present invention, present sensing and displaying apparatus, such as interactive arrays, often involve as many as 1 million picture elements ("pixels") or more. Each pixel will generally include an arrangement of circuitry which collectively will be hereinafter referred to as a "cell." Each cell may serve as an independent sensing element, an independent display or display driving element, or both. Of interest herein is the case where each cell is capable of functioning as both a sensing element and a display driving element.

Each cell will generally include a discrete sensing portion including selected circuitry and a photosensitive element whose current-voltage characteristics change in response to the incidence of light. For a discussion of light sensing cells in general, and a novel light sensing cell in particular, see the cross referenced U.S. Pat. No. 5,083,175. Each cell will also generally include a discrete display portion, usually including a control means such as a thinfilm transistor (TFT) or diode for controlling the state of a pixel of an active display matrix. For a general discussion of active display matrices, and control of individual pixels in such matrices, see *Manufacturing Hurdles Challenge Large-LCD Developers, IEEE Spectrum*, September 1989, pp. 36-40, which is also incorporated by reference herein. For an example of integration of the sensing and display portions, see U.S. Pat. No. 4,655,552, Apr. 7, 1987, to Togashi et. al., which discloses a light sensing circuit which allows data to be input through a display panel.

A number of disadvantages are presented by known sensing apparatus. These include, for example, the requirements that for some sensing apparatus light must be incident on a cell at the same time that the cell is polled (checked for the results of the incidence of light), the need in other sensing apparatus for three or more separate interconnections to each cell, and the incompatibility of still other apparatus with circuitry capable of providing gain, each as described in detail in the aforementioned copending application of Hack et al.

In addition, the integration of sensing and display portions into a single apparatus presents additional problems. For example, the required number of interconnections, the circuit size, and the circuit complexity, increases, while the yield decreases. Related to this is the need to isolate the sensing portion from the display portion in order to prevent the high voltage applied to the display driving lines from disrupting the sensor circuitry, which limits the extent to which the sensor and display portions may be integrated. Also, due to the differing natures of the components of the sensing and display apparatus, fabrication techniques for the two may differ or be incompatible, requiring hybridization and/or complex fabrication procedures.

These and other problems are addressed by various aspects of the present invention, which is summarized then described in detail below.

SUMMARY OF THE INVENTION

The present invention has come about through the realization that it would be highly desirable to be able to provide a sensing and display apparatus requiring a minimum number of metalized lines connecting each cell and its associated driving and decoding electronics. This improves the yield of operable devices by reducing the opportunities for mechanical and electrical defects. Thus, one aspect of the present invention is the provision of a novel sensing and display apparatus requiring only two interconnection lines per cell.

The interconnection lines in traditional two dimensional arrays are referred to as row address lines, each typically associated with a horizontal row of cells, and column data lines. Together, these two lines can poll or address any cell in the array individually. It forms another aspect of the present invention that each row address line is designed to simultaneously serve two purposes. First, the line serves to enable the sensor and display circuits associated with each cell of a row of cells so that light incidence information may be read out from that row, and second, the line serves to reset each sensor circuit of the cells of the immediately preceding row to a state wherein the sensor circuits of those cells may detect light.

It has been realized that the high voltage applied to the display driving lines would, if applied also to the sensor circuitry, disrupt the sensing of incident light. For example, voltage or current transients might be generated in a sensor circuit which could take prohibitively long to settle and render the sensor output meaningless. Also, if proper timing of the sensing and display portions is not observed, the driving of the display could be erroneously interpreted as light incidence data by the sensing portion. However, maintaining too great a physical isolation between the sensing and display driving portions could result in unnecessarily large and complex circuit topography, and maintaining too great a temporal separation between sensing and display driving could result in sensing delay, display flicker, etc. Thus, it forms another aspect of the present invention that an integrated sensing and display driving apparatus is provided with a minimized physical isolation between the sensing and display portions, and sufficient electrical isolation to prevent the deleterious effects resulting from application of a display driving potential to sensing circuitry. Furthermore, it forms another aspect of the present invention that an integrated sensing and display driving apparatus is provided having a timing scheme which allows sensing and display driving in a short time frame, yet maintains the required separation between the sensing and display driving functions.

The present invention has also come about through the realization that it would be highly desirable to be able to sense the incidence of light on a cell at any time, independent of the timing of the polling of the cell itself. Thus, another aspect of the present invention is the provision of a novel light sensing circuit allowing detection of incident light at any time during the polling cycle which may be utilized in a combination sensing and display apparatus. Related to this aspect is the aspect that the present invention allows independently maintaining the unique illumination information about each cell for later processing.

Additionally, it has been realized that monolithic fabrication of the sensing and display driving apparatus would be highly desirable, especially if such apparatus could be formed from amorphous silicon, to enable large-scale integration and production of large sized arrays of light sensing and display driving apparatus according to the present invention, and allow utilization of the simple, inexpensive, and low temperature fabrication techniques used in amorphous silicon processing. Therefore, it is yet another aspect of the present invention, that the circuitry disclosed herein may be monolithically formed of amorphous silicon according to amorphous silicon processing techniques known in the art.

The capability of operation in a color regime, in either the sensing or display driving functions or both, would greatly supplement the capabilities of a monochrome sensing and display apparatus. Thus, according to a further aspect of the present invention, a color sensing apparatus may be obtained by forming, depositing, or placing a color filter or filters over the photosensitive elements of selected light sensing circuits. Such color sensing apparatus may find application in, for example, distinguishing between different light sources, etc.

A still further aspect of the present invention is that the display driving portion of the apparatus is compatible with standard active-matrix LCDs. Furthermore, the provision of a sensing and display apparatus as disclosed herein having a color filter arrangement associated with the display such that the display controlling aspects of the present invention allow control of a color display forms yet another aspect of the present invention.

The present invention overcomes a number of the disadvantages and limitations of the prior art by providing, inter alia, a combination sensor and display driving apparatus comprising an input terminal, an output terminal, a conductive element interconnecting said input and output terminals, a multiple-state sensing device, means for establishing an initial state of said sensing device, means connected to said sensing device for changing the initial state of said sensing device in response to the incidence of electromagnetic or ionizing radiation thereupon, means connected to said conductive element and to said sensing device for modifying the conductance of said conductive element as a function of the state of said sensing device, and a display driving element connected to said input and output terminals. The invention will be further understood from the following detailed description and drawings.

DETAILED DESCRIPTION

Figure 1:
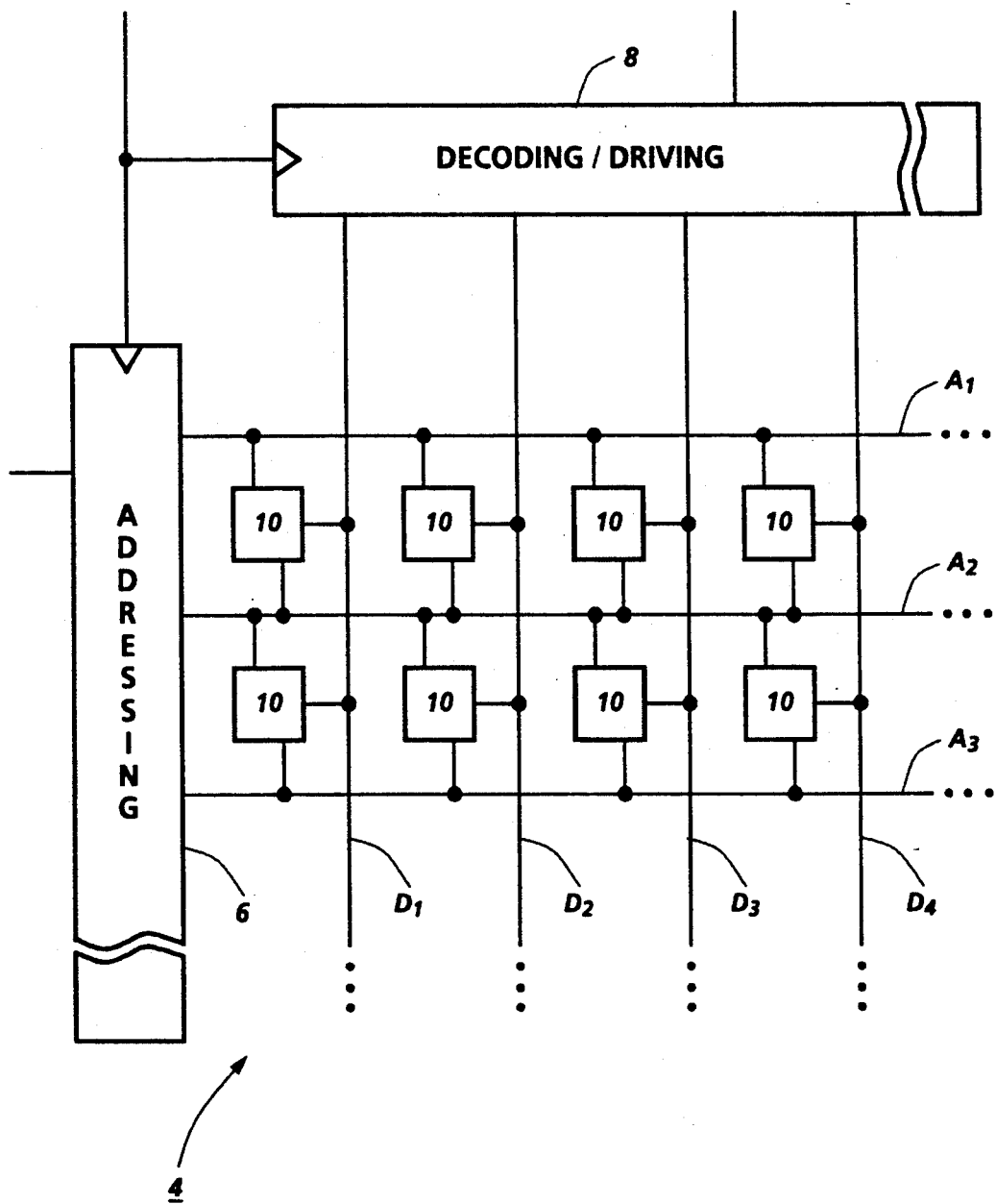
FIG. 1 shows a two dimensional array including sensor and display driving apparatus of the type disclosed and discussed with regard to the FIGS. 2–3a herein.

Referring to FIG. 1, there is shown therein a two dimensional sensor and display driving array 4, comprising addressing means 6, decoding/driving means 8, a plurality of cells 10, and a grid like pattern of horizontal electrically conductive lines or interconnections which, for the present description, will be hereinafter referred to as row address lines, designated as $A_1, A_2, \ldots A_n, A_{n+1}, \ldots$, and vertical electrically conductive lines or interconnections which, for the present description, will be hereinafter referred to as column data lines, designated as $D_1, D_2, \ldots, D_s, \ldots$. In such an array 4 each cell 10 must be individually addressable. This independent addressing is conveniently and commonly facilitated by the grid-like pattern of interconnections shown. This independent addressing allows array 4 the capability of sensing the incidence of light thereon on a cell-by-cell basis at any time during the polling cycle of the cells 10. Furthermore, such an array 4 is capable of driving a display, such as an active matrix LCD (not shown), also on a cell-by-cell basis. Each of the elements of array 4 will be described in further detail herein, with a focus on the dual function of the cells 10 as sensor apparatus and as display driving apparatus.

Figure 2:
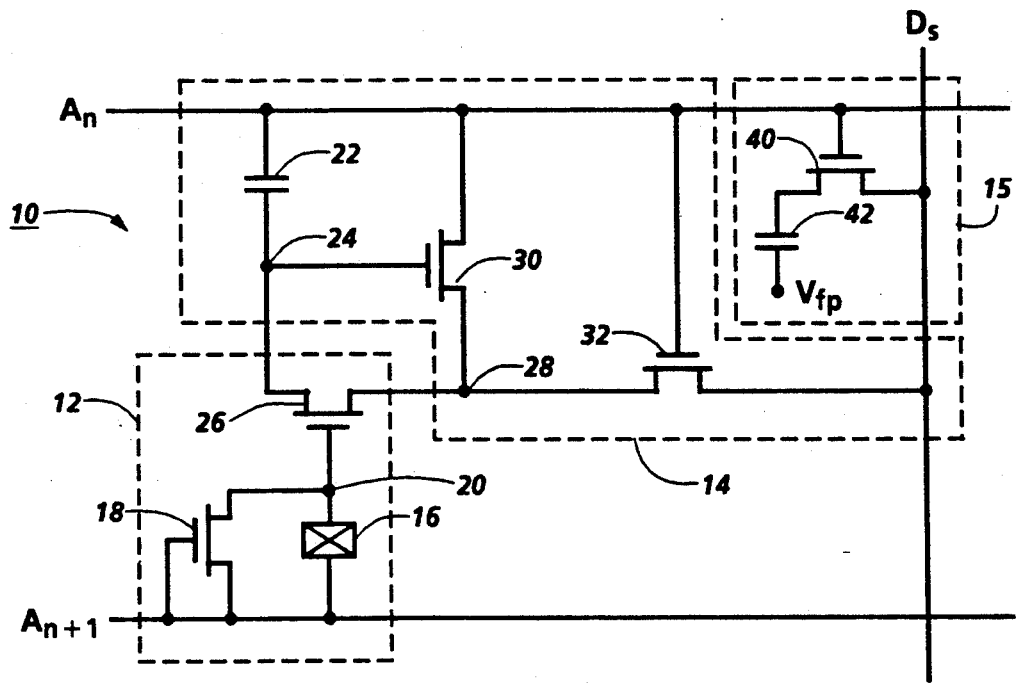
FIG. 2 shows a detailed schematic illustration of a sensor and display driving circuit according to one embodiment of the present invention.

As shown in FIGS. 1 and 2, bounding each cell 10 in the two dimensional array 4 will be a first row address line $A_n$ and a second row address line $A_{n+1}$, as well as at least one column data line $D_s$. A typical cell 10 of the two dimensional array 4 is shown in FIG. 2, in which like reference numerals denote like elements of the present invention in each of the figures herein.

With reference now to FIG. 2, cell 10 may, for the purposes of illustration, be divided into three regions: first, a photosensor circuit region 12; second, a current conducting region 14; and third, a display driving region 15. The photosensor circuit region 12 of the embodiment of FIG. 2 consists of a multiple-state (discrete or continuous) photoelectric sensing means 16, and two control means such as transistors 18 and 26. Multiple-state photoelectric sensing means 16 (or simply photoelectric sensing means 16) may be one of a wide variety of sensors of the type described above which has at least two states, for example referred to as ON and OFF. For example, photoelectric sensing means 16 may be a sensor of the type described in U.S. Pat. No. 5,083,175, which is incorporated by reference herein. The ON state may be either the conductive state or the current producing state of photoelectric sensing means 16. Alternatively, photoelectric sensing means 16 and transistor 18 may be replaced by a single photovoltaic device such as photodiode 12' described further below.

Transistors 18 and 26, as well as all transistors referred to and described herein, unless otherwise noted, are of the type including a control terminal, or gate electrode, and a current path, or channel, controlled by said control terminal, said channel having first and second ends connected to first and second channel electrodes, respectively. Such transistors will generally be of the field effect transistor (FET) family, although other types of transistor devices may be employed with the same or similar results as described herein. In the event the array is fabricated from amorphous silicon, such transistors will generally be N-channel transistors although variations, such as polycrystalline-based apparatus, may employ either N-or P-channel devices where appropriate.

Transistor 18 is connected such that its gate electrode and a first of its channel electrodes are connected to row address line $A_{n+1}$. The second of its channel electrodes is connected to a first node 20. Photoelectric sensing means 16 is connected such that one terminal thereof is connected to row address line $A_{n+1}$ and a second terminal thereof is connected to first node 20. The gate of transistor 26 is connected to node 20, a first of its channel electrodes is connected to a second node 24, and a second of its channel electrodes is connected to a third node 28.

The current conducting region 14 of the embodiment of the present invention shown in FIG. 2 consists of a capacitor 22 having one terminal thereof connected to row address line $A_n$, and a second terminal connected to a second node 24. Current conducting region 14 also includes transistor 30, one of whose channel electrodes is connected to node 28. The gate of transistor 30 is connected to node 24, while the other of its channel electrodes is connected to row address line $A_n$. A first channel electrode of a third transistor 32 will also be connected to node 28. The gate of transistor 32 is connected to row address line $A_n$ and its second channel electrode is connected to column data line $D_s$.

The display driving region 15 of the embodiment shown in FIG. 2 consists of a transistor 40 having its gate connected to row address line $A_n$, and one of its channel electrodes connected to column data line $D_s$. The other of the channel electrodes of transistor 40 is connected to an electrode which forms one part of a pixel of an active-matrix liquid crystal display (LCD). Such an active-matrix LCD consists, inter alia, of two glass plates sandwiching a liquid crystal material. Electrodes are attached to each plate. The liquid crystal material between the plates acts as a dielectric between the electrodes, thus forming a separate capacitor 42 at each pixel. Transistor 40 acts as a switch that allows a voltage placed on a column data line to be stored in the pixel's capacitance for a frame period (the length of time between frame refresh signals) and isolates that pixel from the data line at all other times. In the case of the embodiment shown in FIG. 2, whereas one of the plate electrodes of capacitor 42 is connected to one of the channel electrodes of transistor 40, the other plate electrode of capacitor 42 is tied to an appropriate potential, for example a front plate potential $V_{fp}$.

The ability to produce each of the elements and interconnections described above in large area format by relatively simple and inexpensive processes afforded by amorphous silicon technology motivates the monolithic fabrication of all such components of cell 10 from that material. Furthermore, amorphous silicon technology allows formation of such elements and interconnections on a large, inexpensive substrate such as glass. Thus, the present invention, when fabricated from amorphous silicon, may be formed directly on a surface of an LCD which uses glass plates. However, equivalent results would be obtained, and specific design goals may be realized, by fabricating some or all of the components of cell 10 from single crystal or polycrystalline silicon, germanium, etc., and coupling the display and the circuitry by appropriate means known in the art.

The method of operation of the device is as follows. The operating cycle of each cell 10 may be divided into two modes: first is the sensing mode, and second is the display driving mode. The mode may be controlled by a control circuit (not shown) which interfaces with addressing means 6 and decoding/driving means 8, and synchronized by a clock signal (also not shown).

Figure 4:
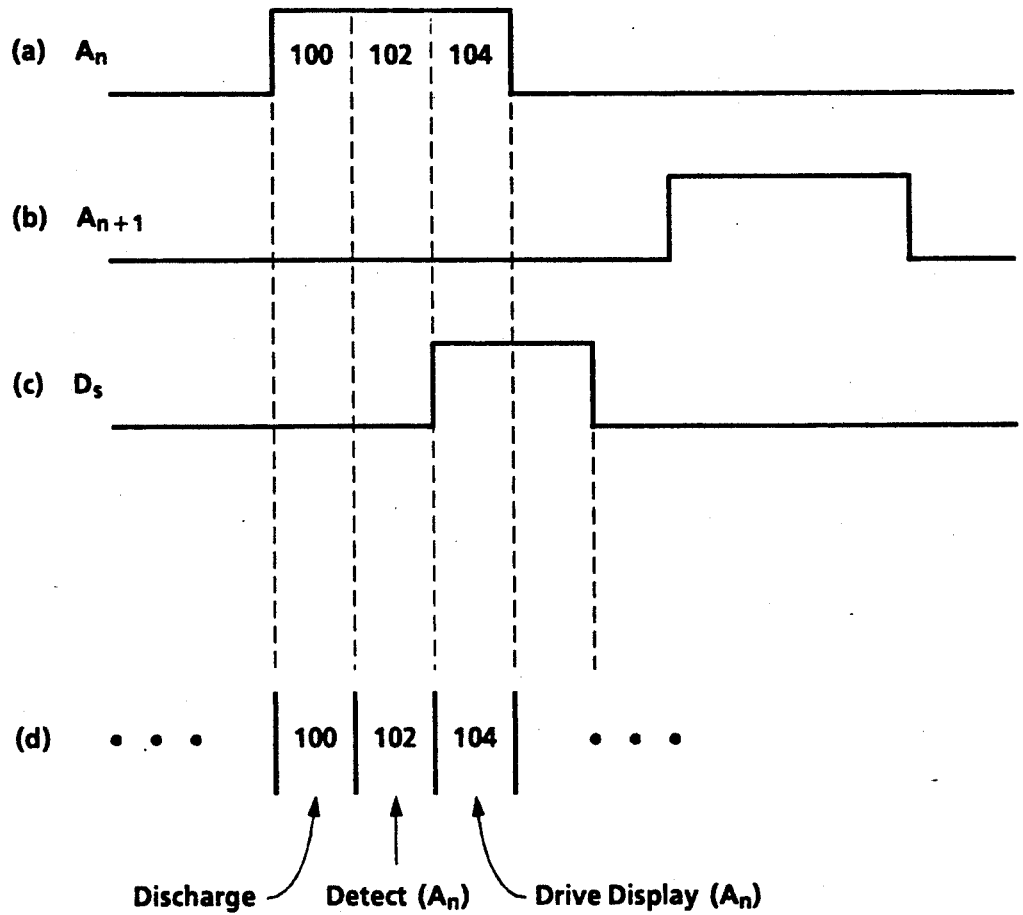
FIG. 4 shows the timing and states of various of the lines relative to one another and to a clock signal according to one or more embodiments of the present invention, as referred to in the following detailed description.

Focussing first on the sensing mode, one role of addressing means 6(FIG. 1) is to sequentially raise each row address line in the array to a given voltage level, one row address line at a time, starting first with line $A_1$, then $A_2, A_3, \ldots$ A row address line is raised to and held at an elevated, or high voltage for a predetermined period of time then returned to a low voltage. After a suitable amount of time, the voltage of the next row address line is raised and held high for the predetermined period of time. This is shown in FIG. 4 for $A_n$ at (a) and for $A_{n+1}$ at (b). In this mode, each of the column data lines will, however, be held at a low potential.

In general terms, cell 10 will act as a switchable current path between a row address line and a column data line, switched by sense state information from photosensor circuit region 12. Specifically, if light has been incident upon cell 10 when its associated row address line $A_n$ is raised to a high voltage, current will be allowed to pass between that row address line $A_n$ and an associated column data line $D_s$. If, however, light has not been incident on cell 10, current will be prevented from passing between row address line $A_n$ and column data line $D_s$. Thus, by examining the current flow on data address line $D_s$, which is in part the role of decoding/driving means 8, it may be determined whether light has been incident upon cell 10.

More specifically, in order to allow conduction by region 14 as a function of the incidence of light on the cell, a charge is established by an address line which may be maintained or released as a function of the incidence of light on the photosensor circuit region 12. Establishing this charge shall hereinafter be referred to as "initializing" cell 10. According to the present embodiment, cell 10 is initialized by charging the gate-channel capacitance of transistor 26. As described above, each cell 10 is connected to two row address lines $A_n$ and $A_{n+1}$. According to the above discussion, only a single row address line may be at a high voltage at any one time. This is to allow unique identification of the cell, or in the sensing mode, to allow unique identification of the illumination state of each pixel. It is conventional that the row address line associated with the cell be the line immediately above that cell, which for FIG. 2 means cell 10 and row address line $A_n$. However, according to the present invention, each row address line will also function to initialize a cell immediately above that line. That is, cell 10 will be initialized by the application of a voltage to line $A_{n+1}$.

Assume for explanation that the gate and channel of transistor 26 are at the same potential, equal to a low voltage as compared to the voltage of row address line $A_{n+1}$. Assume next that in cyclically applying a voltage to each row address line, a positive voltage with respect to ground, for example on the order of 10 volts or more, is applied to row address line $A_{n+1}$. That is, assume that the voltage on row address line $A_{n+1}$ is high. A high voltage is then applied to the gate of transistor 18. The second channel electrode of transistor 18 will thus be at a low voltage as compared to the gate, rendering the channel of transistor 18 conductive (i.e., transistor 18 is turned "ON"). This connects the first channel electrode of transistor 18, and in turn the gate of transistor 26, to the high voltage row address line $A_{n+1}$ via the second channel electrode. The gate-to-channel capacitance of transistor 26 is thereby charged to near the high voltage of row address line $A_{n+1}$. When row address line $A_{n+1}$ returns to the low voltage state, the channel of transistor 18 ceases to be conductive (i.e., transistor 18 is turned OFF) and the connection between its channel electrodes is broken. This effectively isolates the gate of transistor 26 with a high potential between it and the channel, thus initializing the cell.

The cyclical raising of the voltage on each row address line of the array continues until row address line $A_n$ is reached. In both the sensing and display driving modes, raising the voltage on that line will "enable" the cells 10 connected to it from below. In the sensing mode, the effect of enabling a particular cell 10 will depend on whether light has been incident upon the photoelectric sensing means 16 of cell 10 between the time the cell was initialized and the time it was enabled.

Assume first that light has been incident on the photoelectric sensing means 16 at some point during this time. The effect that the incident light will have will depend on the nature of the photoelectric sensing means 16, but for the purposes of explanation it will be assumed that the incident light renders means 16 conductive. This will create a current path between the high voltage of the gate of transistor 26 and the low voltage of line $A_{n+1}$. The stored charge between the gate and channel of transistor 26 will be discharged, bringing the gate and first and second channel electrodes to about the same voltage. This will render the channel of transistor 26 essentially nonconductive. The role of capacitor 22 is to weakly couple the row address line $A_n$ to the gate of transistor 30. Thus, when $A_n$ is at the high voltage state, the gate of transistor 30 will also be at that high voltage state due to capacitive coupling through capacitor 22. Since transistor 26 is essentially an open circuit between nodes 24 and 28 (although there will be a degree of current leakage inherent in each of the transistors), there is no direct current path between the gate of transistor 30 and the low (or ground) voltage of the column data line $D_s$. This presents a sufficiently high potential difference between the gate of transistor 30 and a first of its channel electrodes to thereby render its channel conductive. The channel of transistor 32 (described in further detail below) will also be conductive since its gate is at the high voltage of row address line $A_n$ and a first of its channel electrodes is at the low voltage of column data line $D_s$. Therefore, a current path is provided between row address line $A_n$ and column data line $D_s$. A poll of column data line $D_s$ at this point would show a current flow (typically on the order of microamps) for a predetermined time period (typically on the order of microseconds), which would be interpreted by appropriate circuitry (not shown) as an indication that sufficient light had been incident on cell 10.

If, however, light has not been incident on the photoelectric sensing means 16 during the sensor mode time between the initializing of the circuit and the raising of the voltage on row address line $A_n$, the gate-to-channel potential difference of transistor 26 remains high. The channel of transistor 26 is then conductive. Since this allows the gate and a first channel electrode of transistor 30 to be at approximately the same low voltage, the channel of transistor 30 is nonconductive. This blocks the only effective current path between row address line $A_n$ and column data line $D_s$, since capacitor 22 does not pass D.C. current. A poll of column data line $D_s$ at this point would show very low current flow, which would be interpreted by appropriate circuitry (not shown) as an indication that insufficient light had been incident on cell 10.

Figure 2A:
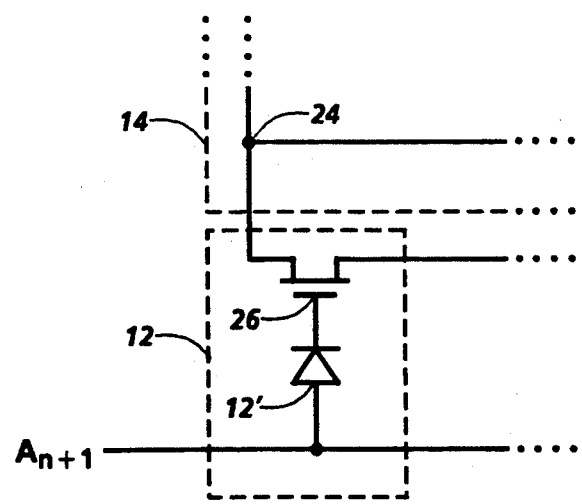
FIG. 2a shows a partial schematic illustration of another embodiment of a sensor and display driving circuit, related to the embodiment of FIG. 2, according to the teachings of the present invention.

With reference to the embodiment of the present invention shown in FIG. 2a, operation of the cell is essentially as described above except for the following. Photoelectric sensing means 16 and transistor 18 are replaced by the single photovoltaic device, photodiode 12′, which is connected such that it is forward biased when row address line $A_{n+1}$ is high. When this is the case, the charging of the gate-to-channel capacitance of transistor 26 is as described above. When row address line $A_{n+1}$ is returned to low, the gate of transistor 26 is isolated and, subject to leakage, the gate-to-channel capacitance of the transistor remains charged. When light is incident on the photodiode, electron-hole pairs are generated which results in a photogenerated current flow, discharging the gate-to-channel capacitance of transistor 26. The photogenerated current is proportional to the incident light intensity. Thus, polling of cell 10 yields the illumination state information as described above.

It is the nature of transistors employed in cells such as that described above that they will have a certain degree of leakage current in their OFF state (i.e., when current flow in the channel should be blocked). This is important from two points of view. First, this must be taken into account when selecting the capacitance of capacitor 22. The capacitance of capacitor 22 must be large enough that the potential difference between the gate and channel of transistor 30 (due to leakage through transistor 26) does not discharge too quickly, but small enough that when transistor 26 is ON it can discharge quickly. Second, leakage current must be prevented from affecting the state of column data line $D_s$ when the cell is not being polled. Since a great many other cells will be sharing column data line $D_s$, and since the current to be detected on column data line $D_s$ is on the order of microamps, the collective leakage onto data line $D_s$ poses the threat of overpowering the valid data which must be detected. Transistor 32, which is nonconductive at all times except when row address line $A_n$ is in the high-voltage state, isolates cell 10 from column data line $D_s$ except, in the sensing mode, when cell 10 is being polled. (As described further below, transistor 32 serves a slightly different purpose in the display driving mode.).

Figure 3:
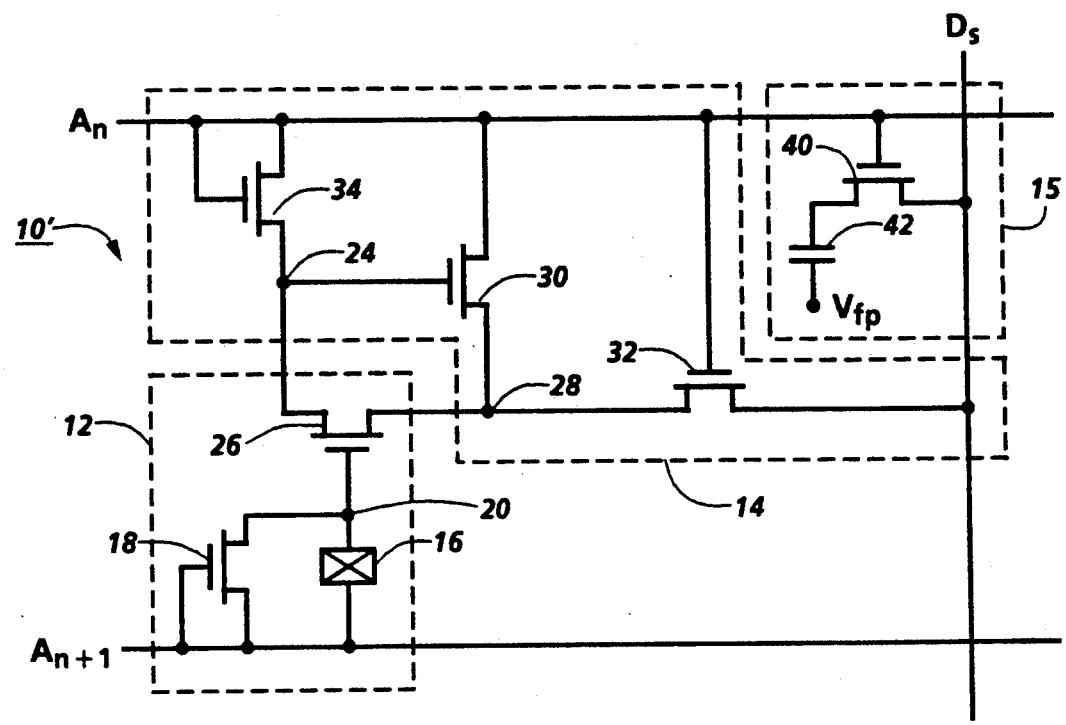
FIG. 3 shows a detailed schematic illustration of a sensor and display driving circuit according to another embodiment of the present invention.

Referring now to FIG. 3, in which the reference numerals used above are also used to refer to like elements, another embodiment of the present invention is shown. The cell 10′ of FIG. 3 differs from the cell 10 previously described only insofar as capacitor 22 has been replaced by transistor 34 having its gate and one of its channel electrodes electrically connected to row address line $A_n$ and a second of its channel electrodes electrically connected to node 24. One role of transistor 34 is identical to that of capacitor 22—to weakly couple the row address line $A_n$ to the gate of transistor 30. The functional difference of this change, however, is to provide a more linear response with respect to the input to cell 10'. That is, the embodiment of FIG. 2 is better suited for digital response since, if sufficient light is incident on sensor 16, a fixed current will flow between address line $A_n$ and data line $D_s$ (although an analog response may be obtained if desirable). However, the embodiment of FIG. 3 is better suited to provide a degree of analog response, or gray scale resolution in that the current flow between address line $A_n$ and data line $D_s$ will vary as a function of the level of incident light.

The charging of the gate-channel capacitance of transistor 26 in this embodiment is identical to that described above. Furthermore, operation of this embodiment in the case where light has been incident upon sensor 16 is also as described above. In fact, operation of the embodiment of FIG. 3 in the case where light has not been incident upon sensor 16 is also as described above except for the fact that since transistor 34 is capable of passing D.C. current whereas capacitor 22 of the embodiment of FIG. 2 is not, there is an additional design consideration for this embodiment required to limit the active current path to that through the channel of transistor 30. Transistor 26 is used to control the potential difference between gate and channel of transistor 30. In order to accomplish this, the current carrying capacities of transistors 26 and 34 must be carefully selected. Essentially, when row address line $A_n$ is raised to a high voltage, transistor 34 will be turned ON. This allows row address line $A_n$ to attempt to pull the voltage at node 24 high. However, if light has not been incident on sensor 16, the gate-channel potential of transistor 26 will be high, allowing current to flow through its channel. Thus, competing with address line $A_n$ (via transistor 34) to pull node 24 up to a high voltage will be data line $D_s$ (via transistors 26 and 32) tending to pull node 24 down to a low voltage. By properly selecting the aspect ratio of each of transistors 34 and 26, the current capacity of these transistors may be established such that current through transistor 34 is below the threshold for detection on column data line $D_s$ if no illumination is present, but large enough to allow node 24 to be raised to the high voltage of row address line $A_n$ if illumination is present. Furthermore, if the current capacity of transistor 26 is made to be much greater than the current capacity of transistor 34 then the pull on node 24 by data line $D_s$ will overcome the pull on node 24 by address line $A_n$, and the circuit will settle out with node 24 at the low voltage. In this case, the potential difference between gate and channel of transistor 30 will be below its turn-on threshold, and current will not pass between row address line $A_n$ and column data line $D_s$, which is the desired result when light has not been incident on sensor 16.

Figure 3A:
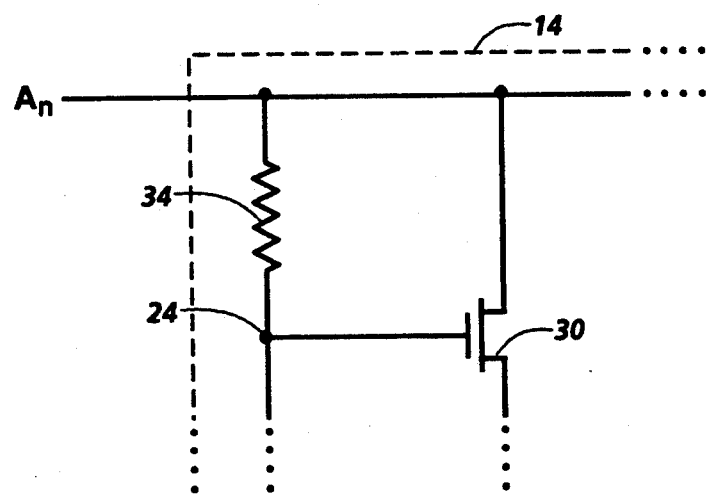
FIG. 3a shows a partial schematic illustration of another embodiment of a sensor and display driving circuit, related to the embodiment of FIG. 3, according to the teachings of the present invention.

The role of capacitor 22 and transistor 34, to weakly couple row address line $A_n$ to the gate of transistor 30, may also be served by a resistor such as resistor 34' shown in FIG. 3a. Operation of the apparatus of FIG. 3a is virtually identical to that described above with regard to transistor 34. In this embodiment consideration must also be given to the current capacities of the various devices, as described above.

In general, gray scale sensing may be accomplished by cell 10' as follows. The potential difference between the gate and channel of transistor 26 will be controlled by the amount of light falling on sensor 16. That is, the greater the amount of light incident on sensor 16, the lower the final potential between the gate and the channel of transistor 26 will be. The level of discharge will, in turn, control the amount of current allowed to flow through the channel of transistor 26. This is facilitated by the ability of transistor 34 to allow current to flow through its channel, as compared to the blocking of current by capacitor 22. This controls the potential difference between the gate and channel electrode connected to node 28 of transistor 30. Finally, this controls the current which may flow through the channel of transistor 30. Polling of data line $D_s$ at this point will yield a current flow determined by the amount of light incident on sensor 16.

Focussing next on the display driving mode, each row address line is held high for a predetermined period of time which may be divided according to the two previously described modes, together with a third, discharge mode. Since capacitor 42 may be charged just prior to the sensing of cell 10, it is necessary to discharge that capacitor so that it does not effect the measuring of line $D_s$ for current. This is done by turning on transistor 40 while keeping line $D_s$ low or tied to ground. Capacitor 42 is then discharged via the channel of transistor 40. With reference to FIG. 4, this is shown in region 100 of (a) and (c). Region 102 represents the state of line $A_n$ in the sensing mode, while region 104 represents the display driving mode for line $A_n$. During this time, data line $D_s$ is driven by the decoding/driving means to an appropriate voltage which is transmitted to capacitor 42 via transistor 40, such that when $A_n$ goes low, the desired voltage is left on capacitor 42.

This points out another function of transistor 32. The driving voltage on line $D_s$ in the display driving mode is sufficiently high (for example 10 or more volts) that should it be allowed to charge the nodes and capacitances of the photosensor circuit region 12 and/or current conducting region 14 between initializing and polling of the cell, the transients established would adversely affect the state of the circuit. Thus, transistor 32 is provided to isolate photosensor circuit region 12 and current conducting region 14 from line $D_s$ between initializing and polling cell 10. Since the time between initialization and polling corresponds to the time that row address line $A_n$ is low (except for the time period 100 reserved for the sensor mode, when column data line $D_s$ is held low) the time that transistor 32 is required to isolate photosensor circuit region 12 and current conducting region 14 from the state of line $D_s$ is the time that $A_n$ is low. Thus, the gate of transistor 32 is connected to line $A_n$. Since column data line $D_s$ will not be charged for the display driving mode during time 100, transistor 32 isolates photosensor circuit region 12 and current conducting region 14 for the entire needed period of isolation.

The resulting cell 10 is a timing-independent sensing and display apparatus, and one which requires only two interconnection lines per cell. This is facilitated by structuring the cell such that each address line enables the sensor and display circuits of the cells below it, and resets each sensor circuit of the cells above it. This structure allows a minimum physical isolation between the sensing and display portions while maintaining sufficient electrical isolation to prevent the deleterious effects resulting from application of a display driving potential to sensing circuitry, and allows employing a timing scheme for both sensing and display driving within a short time period.

It will be noted that the active element of display driving region 15, TFT 40, is similar in description and operation to the TFTs described with regard to photosensor circuit region 12 and current conducting region 14. Thus, not only may TFT 40 be formed of amorphous silicon, the entirety of cell 10 (excluding the LCD) may be monolithically formed in large-area format by the relatively simple and inexpensive processes afforded by amorphous silicon technology. As previously discussed, however, equivalent results would be obtained, and specific design goals may be realized, by fabricating some or all of the components of cell 10 from single crystal or polycrystalline silicon, germanium, etc.

In general, to those skilled in the art to which this invention relates, many changes in construction and widely differing embodiments and applications of the present invention will suggest themselves without departing from its spirit and scope. For example, by placing a color filter over individual sensors, part of the sensor array or the entire sensor array of the present invention, it would be possible to selectively sense light of particular wavelengths. By blue filtering a pixel, for instance, the pixel will become relatively insensitive to red light input. This may be valuable in digitizing color images, distinguishing between different "color" light pens in a multi pen system, or other application where color differentiation is important. Furthermore, the sensor itself may be of a type capable of sensing the incidence of electromagnetic or ionizing radiation outside the visible portion of the spectrum. For instance, the sensor may of a type suited for sensing x-ray radiation, infrared radiation, neutron incidence, etc. Alternatively, specific filters may be used which allow sensing of specific portions of the electromagnetic spectrum outside the visible light region. Color displays may also be realized by the present invention by the selected placement of color filters over the pixels of the LCD.

Another variation of the above description is based on the fact the transistor 40 can select a control potential that could be connected to any display device which employs such a control potential to modulate its optical properties. Thus, some other display apparatus such as an electroluminescent device, LED, or the like may be used in place of the LCD.

In fact, any nonlinear element, such as a diode, may be used in place of the TFTs. Furthermore, in certain circumstances it may be desirable to locate sensing apparatus not in every cell but in, say, every other cell.

In all, many variations on the ideas presented above are possible and within the contemplation of the present invention. The precise arrangement of such alternatives will depend upon the actual embodiment contemplated, and would be within the realm of one of ordinary skill in the art based on the present disclosure. Thus, the disclosures and descriptions herein are illustrative, and are not intended to be in any sense limiting.

What is claimed is:

1. An array of combination sensor and display driving apparatus, comprising:
a plurality of combination sensor and display driving apparatus of the type including a sensor circuit, comprising:
a first terminal;
a second terminal;
a conductive element electrically interconnecting said first and second terminals;
a multiple-state sensing device;
means for establishing an initial state of said sensing device;
means connected to said sensing device for changing the initial state of said sensing device in response to the incidence of electromagnetic radiation thereupon;
means connected to said conductive element and to said sensing device for modifying the conductance of said conductive element as a function of the state of said sensing device; and
means for driving a display in response to signals provided by said first and second terminals, said means being connected to said first and second terminals; and
a plurality of row interconnections, each said row interconnection electrically connected to at least one of said sensor and display driving apparatus and each sensor and display driving apparatus electrically connected to at least one row interconnection; and
a plurality of column interconnections, each said column interconnection electrically connected to at least one of said sensor and display driving apparatus and each said sensor and display driving apparatus electrically connected to at least one column interconnection.

2. The array of claim 1, wherein each of said apparatus is electrically connected to two row interconnections, at least one of said row interconnections capable of both establishing an initial state of a sensing device and enabling an apparatus.

3. The array of claim 1, wherein each said apparatus is polled when the conductance between said first and second terminals of said apparatus is measured, and further where the conductance of said conductive element of said apparatus may be maintained between its modification and initialization, independent of when said apparatus is polled.

4. The array of claim 1, wherein each of said apparatus is formed of amorphous silicon.

5. The array of claim 1, further comprising a color filter positioned proximate each of said means for changing the initial state of said sensing device, said color filter capable of discriminating between different wavelengths of incident light such that said means for changing the initial state of said sensing device changes the initial state of said sensing device when light within a selected bandwidth around a selected wavelength is incident thereon and does not change the initial state of said sensing device when light outside said bandwidth is incident thereon.

6. The array of claim 1, wherein each said apparatus further includes means for providing gain connected to its conductive element.

7. The array of claim 1, further including a liquid crystal display device whose display state is driven by said means for driving a display of each said apparatus.

* * * * *